Aug. 20, 1957  H. H. WHEATON ET AL  2,803,430
CENTRIPETAL TYPE TURBINE

Filed Nov. 25, 1953  3 Sheets-Sheet 1

INVENTORS:
Henry H. Wheaton & Carl K. Czermak,
BY
George D. Richards,
Attorney

INVENTORS:
Henry H. Wheaton & Carl K. Czermak,
BY
George D. Richards,
Attorney

Aug. 20, 1957  H. H. WHEATON ET AL  2,803,430
CENTRIPETAL TYPE TURBINE
Filed Nov. 25, 1953  3 Sheets-Sheet 3
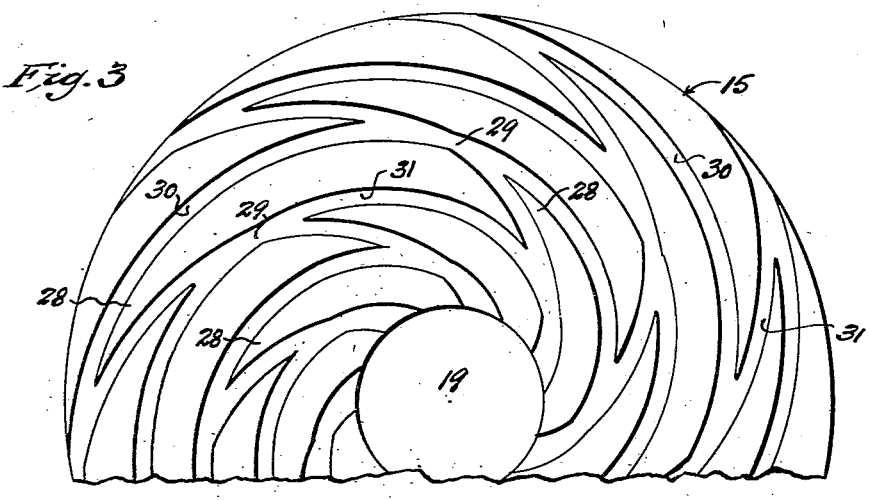
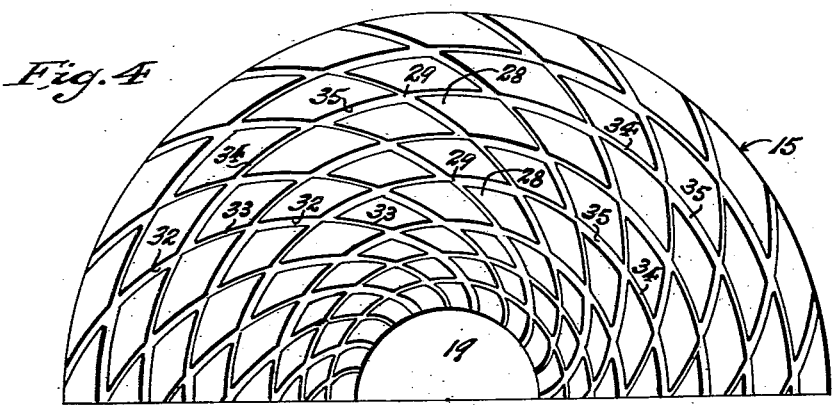
INVENTORS:
Henry H. Wheaton & Carl K. Czermak,
BY George D. Richards
Attorney

2,803,430
CENTRIPETAL TYPE TURBINE

Henry H. Wheaton, Verona, and Carl K. Czermak, Montclair, N. J.

Application November 25, 1953, Serial No. 394,384

12 Claims. (Cl. 253—55)

This invention relates to turbines, and has reference, more particularly, to a power fluid driven turbine of the centripetal type.

The invention has for an object to provide a turbine wherein the rotor is formed with intersecting ducts leading spirally from its periphery to an axial exhaust passage, and so relatively arranged that neighboring ducts pass across one another at their points of intersection; said ducts providing, at their points of intersection, vane-like formations upon which a power fluid acts, the power fluid being delivered at a plurality of points around the periphery of the rotor through suitably formed jets.

The invention has for a further object to provide a turbine rotor wherein the intersecting ducts are of less width in the direction of the radius of the rotor than their depth in a direction parallel to the axis of the rotor, so that the duct passages have substantially greater power fluid contacting surface area at the sides thereof which are parallel to the rotor axis than at the radial surfaces thereof, and wherein at points where ducts intersect a confluence of two crossing streams of power fluid occurs, so that said streams join and divide and, in so doing, act upon interior side wall surfaces of the ducts inwardly of their points of intersection, whereby said surfaces define vanes upon which the power fluid also reacts to apply torque to the rotor; said points of intersection of the ducts also providing venturi passages which cause changes in velocity of the power fluid, whereby to intensify the power thrust or drag of said fluid.

Other objects, not at this time more particularly enumerated, will be understood from the following detailed description of the invention:

Illustrative embodiments of this invention are shown in the accompanying drawings, in which:

Figs. 3 and 4 are fragmentary views, similar to that of Fig. 2, but respectively showing modified forms and arrangement of intersecting ducts with which the turbine rotor may be provided.

Similar characters of reference are employed in the above described views, to indicate corresponding parts.

Figure 1:
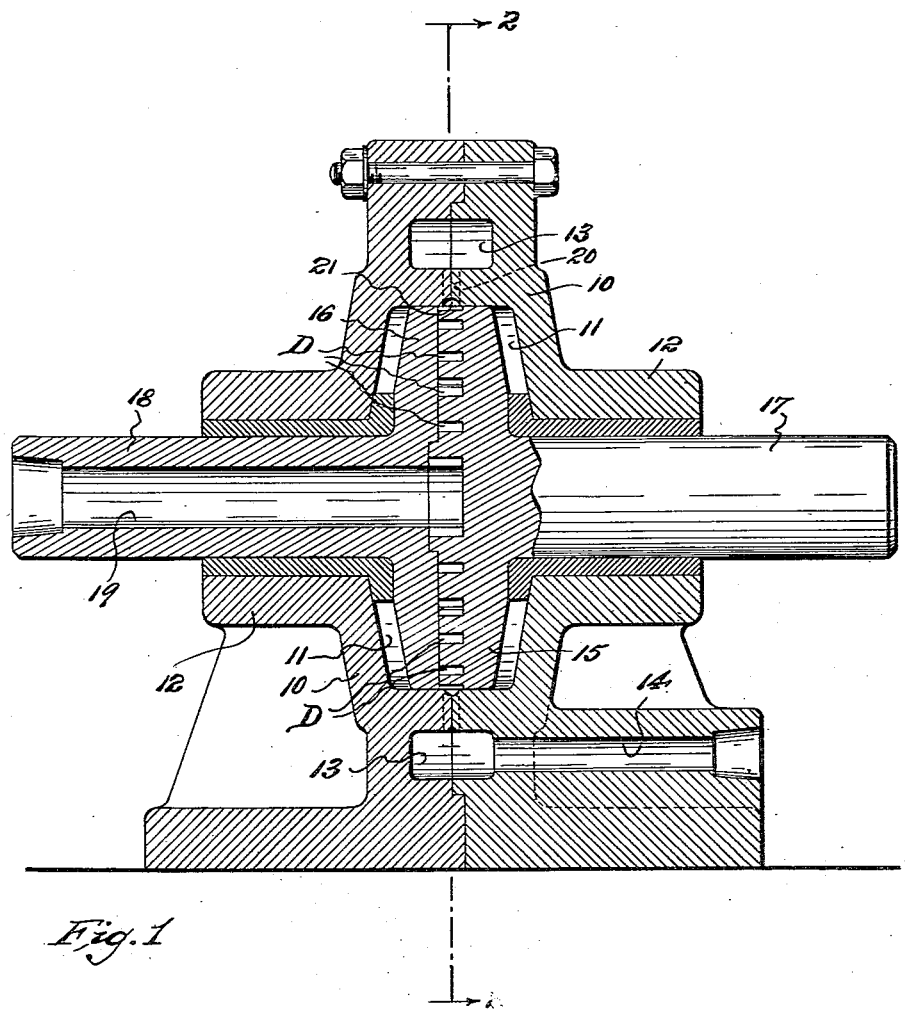
Fig. 1 is a longitudinal sectional view of a turbine according to the principles of this invention.

Referring first to Fig. 1, the turbine according to this invention is shown in an illustrative form thereof which comprises a casing or housing 10 having a central chamber 11 to enclose the turbine rotor, and from opposite sides of which extend bearings 12 in which the rotor shaft is journaled. Surrounding the rotor chamber 11, the housing is provided with an annular power fluid delivery chamber 13. Communicating with said delivery chamber 13 is an intake passage 14, through which power fluid from a suitable source is conducted to said delivery chamber. The rotor, in a simple form thereof, comprises two circular rotor sections 15 and 16, which are suitably secured together in face to face relation. Said rotor sections 15 and 16 are respectively provided with respective shaft sections 17 and 18 unitary therewith, the same being journaled in the bearings 12 of the housing. At least one of the rotor sections, e. g. the rotor section 15, is provided in its face with spirally extending intersecting grooves or channels, to be hereinafter more specifically described, the open sides of which are closed by the contiguous opposed rotor section 16, thus providing the rotor with a multiplicity of spirally extending intersecting ducts D leading inwardly, through the rotor interior, from the periphery thereof to and in communication with an axial exhaust passage 19 with which at least one of the rotor shaft sections, e. g., the shaft section 18, is provided. Formed in the housing 10, to extend from the power fluid delivery chamber 13 to the rotor periphery, are a plurality of circumferentially spaced power fluid discharge jets 20, the same being obliquely disposed in the direction of rotation to be imparted to the rotor. Formed either in the housing or in the periphery of the rotor is an annular channel 21 with which the jets 20 communicate, and which in turn communicates with the intake ends of the rotor ducts D; this annular channel 21 being of less cross-sectional area than the cross sectional area of respective jets 20.

Figure 2:
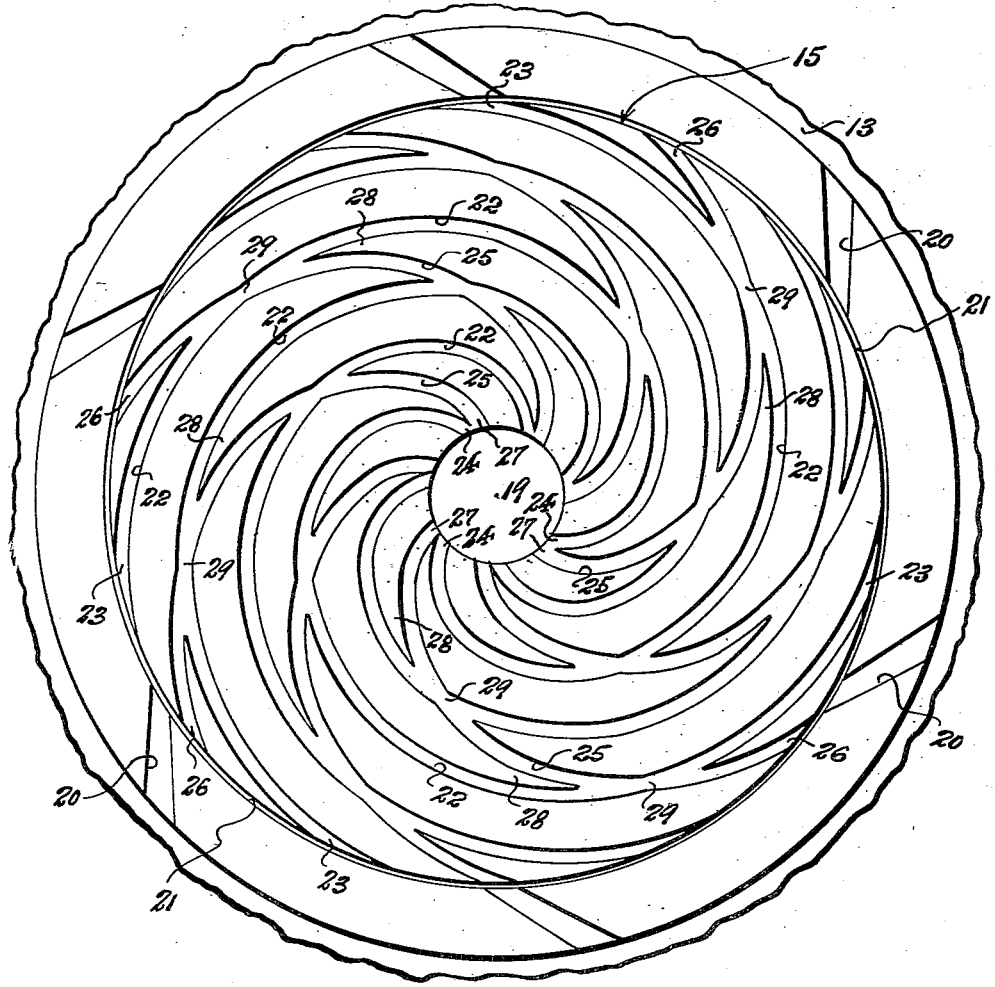
Fig. 2 is a fragmentary cross sectional view, taken on line 2—2 in Fig. 1, but drawn on an enlarged scale, this view showing one form and arrangement of intersecting ducts with which the rotor of the turbine is provided.

Referring now to Fig. 2, the same shows one illustrative form and arrangement of spirally extending intersecting ducts with which the turbine rotor is provided. In this arrangement, said ducts comprise a succession of relatively long spiral ducts 22 having their intake ends 23 equally spaced circumferentially around the rotor periphery, and their discharge ends 24 spaced circumferentially around and in communication with the exhaust passage 19 of the rotor, and said ducts further include a succession of relatively short spiral ducts 25 having their intake ends 26 spaced circumferentially around the rotor periphery, at points intermediate the intake ends 23 of the aforesaid long ducts 22, and their discharge ends 27 also spaced circumferentially around and in communication with the exhaust passage 19 of the rotor. The said ducts 22 and 25 are of less width in the direction of the radius of the rotor than is their depth in direction parallel to the axis of the rotor, so that the surface area of the side walls thereof, which are parallel to the axis of the rotor, provide power fluid contacting surface areas which best react to propulsion effect of streams of power fluid moving through said ducts. Said side walls provide surface area greater than the area of the duct surfaces which are perpendicular to the axis of the rotor. Due to the difference in lengths and the staggered relation of the long and short ducts 22 and 25, said long ducts 22 intersectingly extend across a plurality of the short ducts 25, whereby their side walls define outer and inner vanes 28 at the intersections of the walls of said ducts, and, furthermore, at each point where said ducts intersect a venturi passage 29 is also formed.

Preferably, the power fluid delivery jets 20, as circumferentially spaced around the periphery of the rotor, are less in number than the number of pairs of long and short ducts 22 and 25. For example, if the rotor is provided with seven pairs of long and short ducts, as shown in Fig. 2, then six equally spaced apart jets 20 will be provided. By this arrangement and in conjunction with the annular channel 21 of reduced cross-sectional area intermediate the periphery of the rotor and said jets, partial cut-offs of full volume of power fluid flow alternately occur during delivery of the power fluid to respective ducts 22 and 25 constituting pairs thereof, whereby a pulsating effect is produced which substantially increases the propulsion power fluid thrust or drag upon the rotor.

Figure 2A:
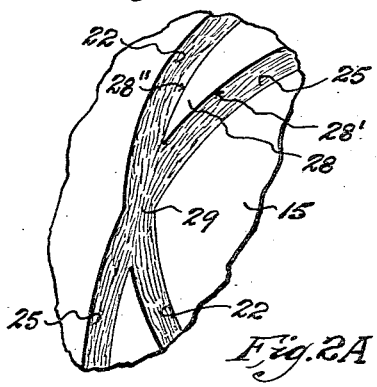
Fig. 2A is a fragmentary detail view of a point of intersection of two ducts by which a vane is formed.

At each venturi passage 29 where spiral ducts cross one another, the confluent stream traversing said passage will be momentarily accelerated as it approaches the adjacent vane 28 where the confluent stream again divides. By reason of this, novel power thrust or drag effects are exerted by the diverging streams upon the vane. These effects will be best understood by reference to Fig. 2A, which shows the inwardly diverging stream, due to both its forward motion and centrifugal force induced by its vortical movement, in direct dragging thrust contact with the inner concave face 28' of the vane 28, while the outwardly diverging stream, due likewise to its forward motion and centrifugal force induced by its vortical movement, tends to lose contact with the convex face 28" of the vane 28, so that said convex face effects an air foil like action, which causes this stream to exert "lift" upon the vane in direction of rotor revolution, while at the same time said outwardly diverging stream also makes direct dragging thrust contact with the duct wall surface opposed to said convex face 28" of the vane. The above described effects occur at all of the vane locations formed by the intersecting ducts of the rotor, and consequently a smoothly balanced application of torque producing force is exercised at a multiplicity of symmetrically distributed points throughout the rotor interior.

The power fluid in practice will be supplied under maintained pressure conditions (e. g., as by high pressure steam), and consequently the viscosity of the power fluid is such as to assure strong thrust or drag on the radially outward walls of the spiral ducts, which thrust or drag is enhanced by the inwardly curving extension of said ducts, whereby the power fluid is caused to continuously change direction.

The combination of the above described effects, viz. the thrust or drag of the power fluid upon the radially outward walls of the spiral ducts; the momentary acceleration of power fluid at the venturi passages 29; and the "lift" effect exerted upon the outer convex faces of the vanes 28, all work together to assure application of the kinetic energy of the power fluid practically 100% for transmission of positive torque to the rotor.

In Fig. 3 is shown a rotor having a somewhat modified arrangement of spirally extending intersecting ducts. In this arrangement, the ducts also comprise a succession of relatively long spiral ducts 30 and a succession of relatively short spiral ducts 31, the side walls of which provide power fluid contacting surface areas. The intake ends of each pair or set of long and short ducts start at a common point on the periphery of the rotor; and the discharge ends of said ducts communicate with the axial exhaust passage 19 of the rotor, either separately or in confluent relation. As thus related, common intake ends of the pairs or sets of long and short ducts are equally spaced circumferentially around the rotor periphery. Due to the differences in length and curvature of the long and short ducts 30 and 31, said long ducts intersectingly cross the short ducts, whereby to form, at the various points of intersection of their side walls, both vanes 28 and venturi passages 29. It will be obvious that, with respect to this modified arrangement of the intersecting ducts, substantially the same drag and "lift" effects of power fluid flow therethrough as already above described in connection with the Fig. 2 arrangement of ducts will be attained.

Referring now to Fig. 4, another modified arrangement of intersecting ducts in the rotor is shown. This arrangement comprises intersecting spiral and circular ducts. The spiral ducts comprise alternately successive relatively wide segments 32 and relatively narrow segments 33, and, likewise, the circular ducts comprise alternately wide segments 34 and relatively narrow segments 35. The relatively wide segments 34 of the circular ducts extend between an outlet end of a relatively wide segment of one spiral duct to the inlet end of a relatively wide segment of the next adjacent spiral duct in the direction of revolution of the rotor. In like manner, the relatively narrow segments 35 of the circular ducts interconnect outlet and inlet ends of relatively narrow segments of adjacent spiral ducts. By this arrangement, the side walls of the ducts provide power fluid surface areas along power fluid paths of zig-zag but generally spirally extending formation leading from the periphery of the rotor to the axial exhaust passage 19 of the rotor. It will be noted that by this arrangement a multiplicity of symmetrically distributed vanes 28 are formed at the intersections of the side walls of the spiral and circular ducts, as well as venturi passages 29 in advance of said vanes. It will be obvious that, with respect to this arrangement of intersecting ducts, substantially the same drag and "lift" and pulsating effects previously above described will also be attained, with the added advantage that such effects are multiplied due to the large increase in the number of vanes 28.

Our invention can be embodied in various turbine structural forms and relations now known and practiced in the art.

Although we have shown certain illustrative specific forms and arrangements of the intersecting ducts for a rotor of a centripetal turbine, other forms and arrangements of said intersecting ducts may also be utilized within the scope of the following claims.

Having now described our invention, we claim:

1. A turbine comprising a rotor having an axial exhaust passage, said rotor being provided with internal intersecting ducts leading from its periphery inwardly to said exhaust passage in generally spiral paths and so relatively arranged that neighboring ducts pass across one another at their points of intersection, and means disposed around the periphery of said rotor to deliver to said ducts a power fluid in rotor impelling movement through said ducts for discharge from said axial exhaust passage.

2. A turbine comprising a rotor having an axial exhaust passage, said rotor being provided with internal intersecting ducts leading from its periphery inwardly to said exhaust passage in generally spiral paths and so relatively arranged that neighboring ducts pass across one another at their points of intersection, means disposed around the periphery of said rotor to deliver to said ducts a power fluid in rotor impelling movement through said ducts for discharge from said axial exhaust passage, and said ducts having side walls adapted to provide power fluid contacting surface areas, said ducts being of less width in direction of the radius of the rotor than their depth in direction of bottom walls thereof which are parallel to the axis of the rotor, whereby said ducts have substantially greater power fluid contacting surface area along the side wall faces thereof which are parallel to the rotor axis than at radial bottom faces thereof.

3. A turbine comprising a rotor having an axial exhaust passage, said rotor being provided with internal intersecting ducts leading from its periphery inwardly to said exhaust passage in generally spiral paths and so relatively arranged that neighboring ducts pass across one another at their points of intersection, means disposed around the periphery of said rotor to deliver to said ducts a power fluid in rotor impelling movement through said ducts for discharge from said axial exhaust passage, said ducts having side walls adapted to provide power fluid contacting surface areas, and side walls of said ducts, where said ducts diverge from their points of intersection, defining vanes intermediate the intersecting ducts against which the streams of power fluid react with rotor impelling effect.

4. A turbine comprising a rotor having an axial exhaust passage, said rotor being provided with internal intersecting ducts leading from its periphery inwardly to said exhaust passage in generally spiral paths and so relatively arranged that neighboring ducts pass across one another at their points of intersection, means disposed around the periphery of said rotor to deliver to said ducts a power fluid in rotor impelling movement through said ducts for discharge from said axial exhaust passage, said ducts having side walls adapted to provide power fluid contacting surface areas, said crossing ducts, where diverging from their points of intersection, defining by their side walls intermediate vanes against which the streams of power fluid react with rotor impelling effect, and the converging and diverging crossing portions of said ducts further defining venturi passages in advance of each vane.

5. A turbine comprising a rotor having an axial exhaust passage, said rotor being provided with internal intersecting ducts leading from its periphery inwardly to said exhaust passage in generally spiral paths and so relatively arranged that neighboring ducts pass across one another at their points of intersection, said ducts having side walls adapted to provide power fluid contacting surface areas, said ducts being of less width in direction of the radius of the rotor than their depth in direction of bottom walls thereof which are parallel to the axis of the rotor, whereby said ducts have substantially greater power fluid contacting surface area along the side wall faces thereof which are parallel to the rotor axis than at radial bottom faces thereof, said crossing ducts where diverging from their points of intersection, defining by their side walls intermediate vanes having convex outer surfaces and concave inner surfaces against which the streams of power fluid react with rotor impelling effect, the converging and diverging crossing portions of said ducts further defining venturi passages in advance of each vane, and means disposed around the periphery of said rotor to deliver to said ducts a power fluid in rotor impelling movement through said ducts for discharge from said exhaust passage.

6. A turbine according to claim 5, wherein the power fluid delivery means comprises a plurality of jets spaced circumferentially around the rotor periphery and obliquely disposed in the direction of rotor revolution.

7. A turbine according to claim 5, wherein the power fluid delivery means comprises a plurality of jets spaced circumferentially around the rotor periphery and obliquely disposed in the direction of rotor revolution, and means to provide an annular channel extending circumferentially around the rotor periphery intermediate the same and said jets, said circumferential passage being of cross sectional area less than the cross sectional areas of the jets.

8. A turbine comprising a rotor having an axial discharge passage, said rotor being provided with internal spirally extending intersecting ducts leading from its periphery inwardly to said exhaust passage, said ducts having side walls adapted to provide power fluid contacting surface areas, and said ducts including a circumferential succession of relatively long spiral ducts having their intake ends equally spaced around the rotor periphery and their discharge ends communicating with said exhaust passage, and a circumferential succession of alternated relatively short spiral ducts extending across and so as to intersect a plurality of said long spiral ducts, said short spiral ducts having their intake ends spaced around the rotor periphery at points intermediate the intake ends of said long spiral ducts and their discharge ends also communicating with said exhaust passage, and means disposed around the periphery of said rotor to deliver to said ducts a power fluid in rotor impelling movement through said ducts for discharge from said exhaust passage.

9. A turbine according to claim 8, wherein said ducts have side walls adapted to provide power fluid contacting surface areas, said ducts being of less width in direction of the radius of the rotor than their depth in direction of bottom walls thereof which are parallel to the axis of the rotor, whereby said ducts have substantially greater power fluid contacting surface area along the side wall faces thereof which are parallel to the rotor axis than at radial bottom faces thereof.

10. A turbine according to claim 8, wherein said ducts where diverging from their points of intersection define intermediate vanes having convex outer side wall surfaces and concave inner side wall surfaces against which streams of said rotor impelling power fluid, from the delivery means therefor, react with rotor impelling effect, and the walls of converging and diverging intersecting portions of said ducts further define venturi passages in advance of each vane.

11. A turbine according to claim 8, wherein the power fluid delivery means comprises a plurality of jets spaced circumferentially around the rotor periphery and obliquely disposed in the direction of rotor revolution.

12. A turbine according to claim 11, wherein the power fluid delivery means is further provided with an annular channel extending circumferentially around the rotor periphery intermediate the same and said jets, said channel being of cross-sectional area less than the cross-sectional areas of the jets.

References Cited in the file of this patent

FOREIGN PATENTS

| 163,522 | Great Britain | May 26, 1921 |
| 285,889 | Great Britain | June 21, 1928 |
| 399,891 | Great Britain | Oct. 19, 1933 |